(12) United States Patent
Sanzi et al.

(10) Patent No.: US 6,477,166 B1
(45) Date of Patent: Nov. 5, 2002

(54) SYSTEM, METHOD AND SWITCH FOR AN MPLS NETWORK AND AN ATM NETWORK

(75) Inventors: Rich Sanzi, Wexford; Walt Wimer; Curt Bujosa, both of Cranberry; Ronald P. Bianchini, Jr., Pittsburgh, all of PA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/608,771

(22) Filed: Jun. 30, 2000

(51) Int. Cl.$^7$ ................................................ H04L 12/56
(52) U.S. Cl. ..................... 370/395.1; 370/392; 370/474
(58) Field of Search .................................. 370/401, 389, 370/392, 466, 467, 473, 474, 410, 422, 426, 352, 353, 354, 399, 395.1, 395.3, 395, 395.52, 395.53

(56) References Cited

U.S. PATENT DOCUMENTS 5,568,477 A * 10/1996 Galand et al.
5,991,300 A * 11/1999 Tappan ........................ 370/392

OTHER PUBLICATIONS

Heinanen, "Multiprotocol encapsulation over ATM adaptation layer 5", Jul. 1993, Network working group, RFC 1483, pp. 1–16.*

* cited by examiner

Primary Examiner—Steven Nguyen
(74) Attorney, Agent, or Firm—Ansel M. Schwartz

(57) ABSTRACT

A communication system. The system includes an MPLS network. The system includes a modified ATM network connected to the MPLS network on which MPLS packets can travel. A switch for switching MPLS packets and ATM cells in a network. The switch includes input ports for receiving MPLS packets and ATM cells from the network. Each MPLS packet has a first label for directing the packet to a desired switch and a second label for directing the packet in the switch to a desired outport in the switch. The system includes output ports for sending MPLS packets and ATM cells to the network. The system includes a mechanism for reviewing the second label of the packet while maintaining the first label with the packet. The reviewing mechanism is connected to the input ports and the output ports. A method for transmitting packets in a communications network. The method includes the steps of sending an MPLS packet on an MPLS network to a first switch connected to a modified ATM network and the MPLS network. Then there is the step of transferring the MPLS packet to a second switch of the ATM network with the first switch through the ATM network.

21 Claims, 3 Drawing Sheets

SYSTEM, METHOD AND SWITCH FOR AN MPLS NETWORK AND AN ATM NETWORK

FIELD OF THE INVENTION

The present invention relates to a communication system formed of an MPLS network and a modified ATM network. More specifically, the present invention relates to a communication system formed of an MPLS network and a modified ATM network where an MPLS packet has a first label which directs the MPLS packet to a switch in the network and a second label which directs the MPLS packet to an output port in a switch.

BACKGROUND OF THE INVENTION

The multiprotocol label switching (MPLS) standard is being pushed within the IETF by large ISP networks (UUNet primarily) and by several networking companies, including Cisco and Juniper Networks.

The ISP network topology of primary concern is a core of ATM switches surrounded by IP routers. The ATM switches provide a mesh of connections between the routers where every router has at least one VC between itself and every other router. The virtual circuits between the routers are "engineered" by the ISP operations team to provide load balancing, efficient usage of the network resources and resilience to link and node failures.

The stability of the core ISP network is of utmost importance to the ISP operations team. ISPs want their core networks to be extremely stable and resilient. They are risk-adverse in this portion of the network, and tend to prefer simple solutions with well-understood failure modes over complicated solutions with unknown or unpredictable failure modes. For example, the mesh of VCCs connecting the routers of internetMCI (now Cable and Wireless) are PVCs. The backup VCCs between routers were PVCs as well, but recently have been converted over to SPVCs (with designated transit lists).

The IP+ATM network architecture has two primary problems, the first being the ability of the network to scale, and the second being the ability of the network to support new types of packet services, The IP+ATM network architecture cannot grow indefinitely for two reasons. The first is that the number of virtual circuits required to connect all the routers together is on the order of N^2 in the number of routers. With 512k connections supported on an ASX-4000, this limits the size of the network to approximately 700 routers (assuming all the connections go through a single ASX-4000 at some point). The second and more serious issue limiting growth is the IP routing protocols themselves. Every router connected to the ATM core is "adjacent" to every other router. For a link-state routing protocol like OSPF, each router has to maintain separate state for the routers it is directly connected to, and all network topology changes seen by one router must be flooded to every adjacent router. Maintaining a large number of adjacencies and processing the topology updates can be very CPU intensive in a large network—processing the flooding messages alone is on the order of N^3 in the number of routers. The IP routing protocols simply were not designed for a large number of adjacencies; the common rule of thumb for OSPF is that an OSPF area is limited to approximately 200 routers.

VC Merge is one possible solution to the N^2 connection space problem. (Recall that VC Merge is an AAL5 connection where an ATM switch merges multiple incoming connections onto the same outgoing virtual circuit.) VC Merge replaces the N^2 mesh of point-to-point virtual circuits with N multi-point to point trees, where each router is at the receiving end of one of the trees, and a possible sender for the remaining N−1 trees.

While VC Merge addresses the connection space issue, it does not address the router adjacency issue. No general solution for this problem is currently known.

Today's Internet is a best-effort packet delivery service where everyone gets the same level of service. ISPs would like to provide more profitable services than best-effort, in order to differentiate their offerings from other ISPs. Two potential service offerings that have momentum within the IEFT Differentiated Services working group are the Virtual Leased Line Service (VLL) and the Assured Forwarding Service (AF). The VLL service is a CBR-like service, while AF-is VBR-like. For the ISP, providing these services means mapping the customer-desired end-to-end behavior onto their network where they have two different control planes, ATM and IP, and two different QOS treatments, ATM strict QOS, and the emerging IP differentiated services QOS, which can be thought of as "loose" QOS.

The present invention solves the above two issues by combining the best of the IP and connection-oriented worlds.

SUMMARY OF THE INVENTION

The present invention pertains to a communication system. The system comprises an MPLS network. The system comprises a modified ATM network connected to the MPLS network on which MPLS packets can travel.

The present invention pertains to a switch for switching MPLS packets and ATM cells in a network. The switch comprises input ports for receiving MPLS packets and ATM cells from the network. Each MPLS packet has a first label for directing the packet to a desired switch and a second label for directing the packet in the switch to a desired output port in the switch. The system comprises output ports for sending MPLS packets and ATM cells to the network. The system comprises a mechanism for reviewing the second label of the packet while maintaining the first label with the packet. The reviewing mechanism is connected to the input ports and the output ports.

The present invention pertains to a method for transmitting packets in a communications network. The method comprises the steps of sending an MPLS packet on an MPLS network to a first switch connected to a modified ATM network and the MPLS network. Then there is the step of transferring the MPLS packet to a second switch of the ATM network with the first switch through the ATM network.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
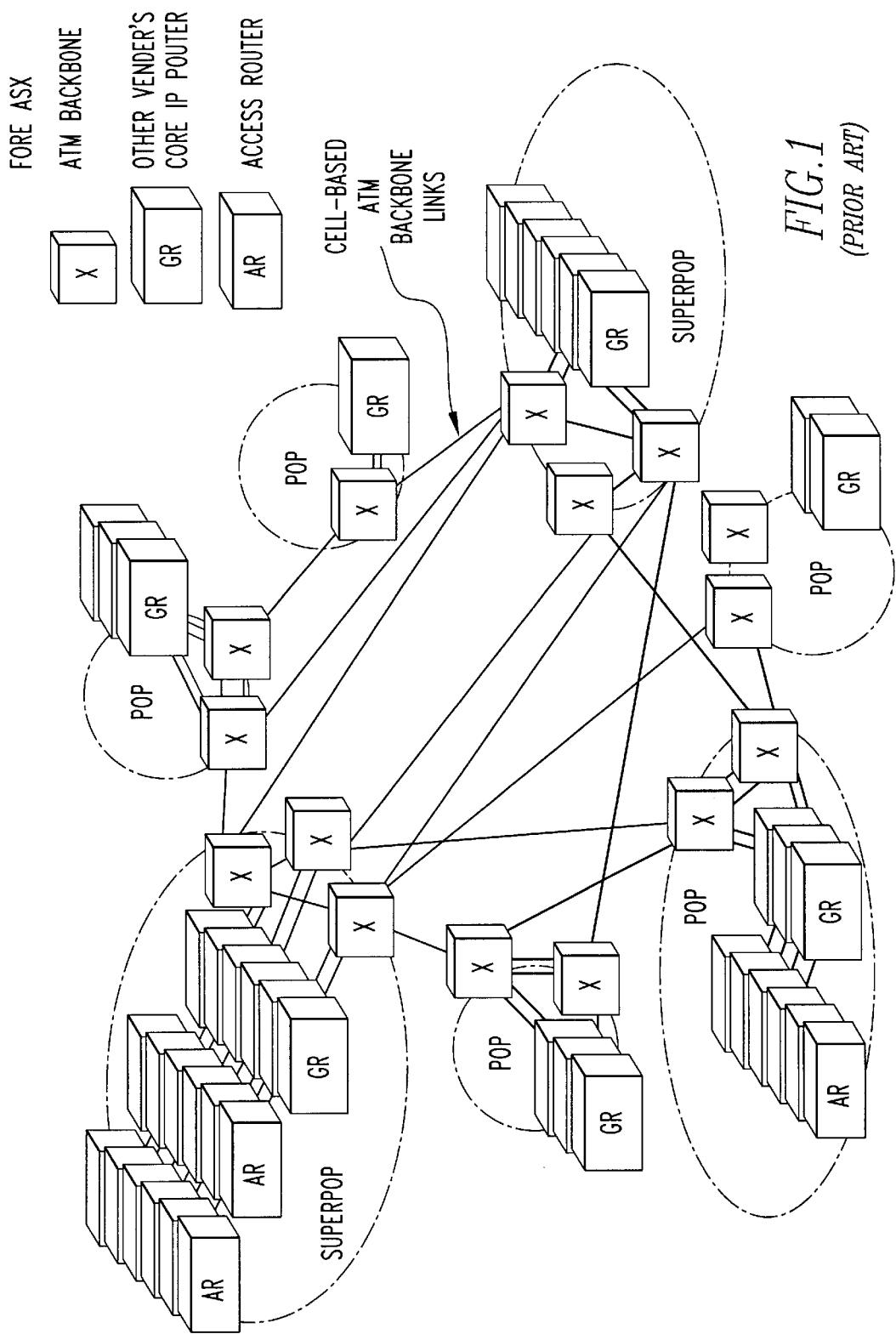
FIG. 1 is a schematic representation of an ISP network of the prior art.
Figure 2:
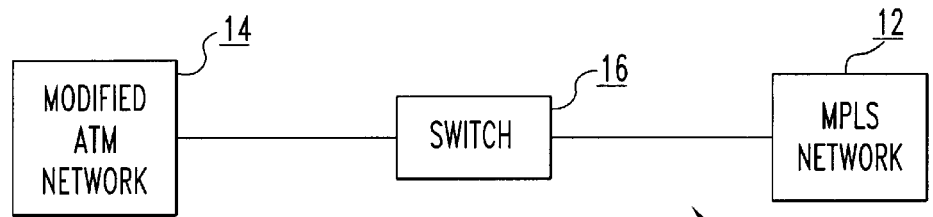
FIG. 2 is a schematic representation of a system of the present invention.

Referring now to the drawings wherein like reference numerals refer to similar or identical parts throughout the several views, and more specifically to FIG. 2 thereof, there is shown a communication system 10. The system 10 comprises an MPLS network 12. The system 10 comprises a modified ATM network 14 connected to the MPLS network 12 on which MPLS packets 18 can travel.

Figure 4:
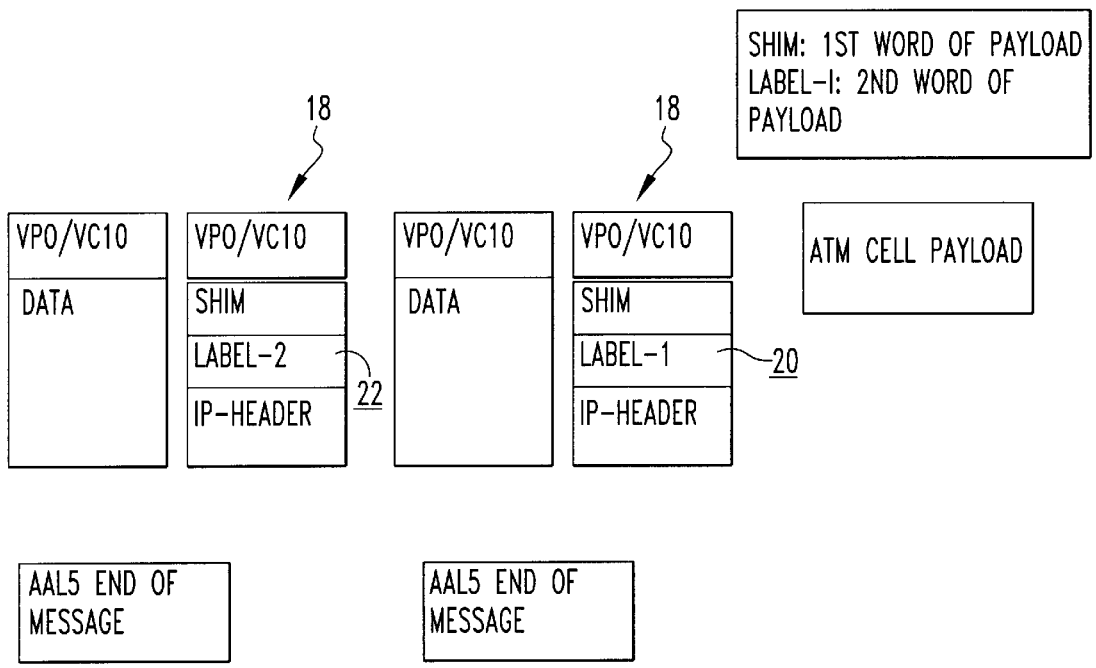
FIG. 4 is a schematic representation regarding an MPLS VC of the present invention.

Preferably, the ATM network 14 has at least one switch 16 and wherein each MPLS packet 18 has a first label 20 for directing the MPLS packet 18 to a desired switch 16 and a second label 22 for directing the MPLS packet 18 in the switch 16 to a desired output port 24 in the switch 16, as shown in FIG. 4. The switch 16 preferably has a mechanism for reviewing the second label 22 of the packet while maintaining the first label 20 with the MPLS packet 18.

Preferably, the switch 16 has a memory 28 with connection information along which the packets travel, the connection information identifying ATM connections and MPLS connections. The switch 16 preferably transfers MPLS packets 18 according to their labels and ATM cells according to their VC/VP connection information stored in the memory 28. Preferably, the MPLS packet 18 is an AAL5 packet.

The first label 20 is preferably disposed in the first word of the first cell of the AAL5 packet. Preferably, the second label 22 is disposed in a second word of the first cell of the AAL5 packet. The first word is preferably a shim header that has a null label value and carries an class of service (COS) value and trace transit list (ITL) value. Preferably, the switch 16 includes a controller 30 which recognizes an end of message (EOM) cell of a previous packet received by the switch 16 and reads the second word of the first cell to obtain the second label 22.

Figure 3:
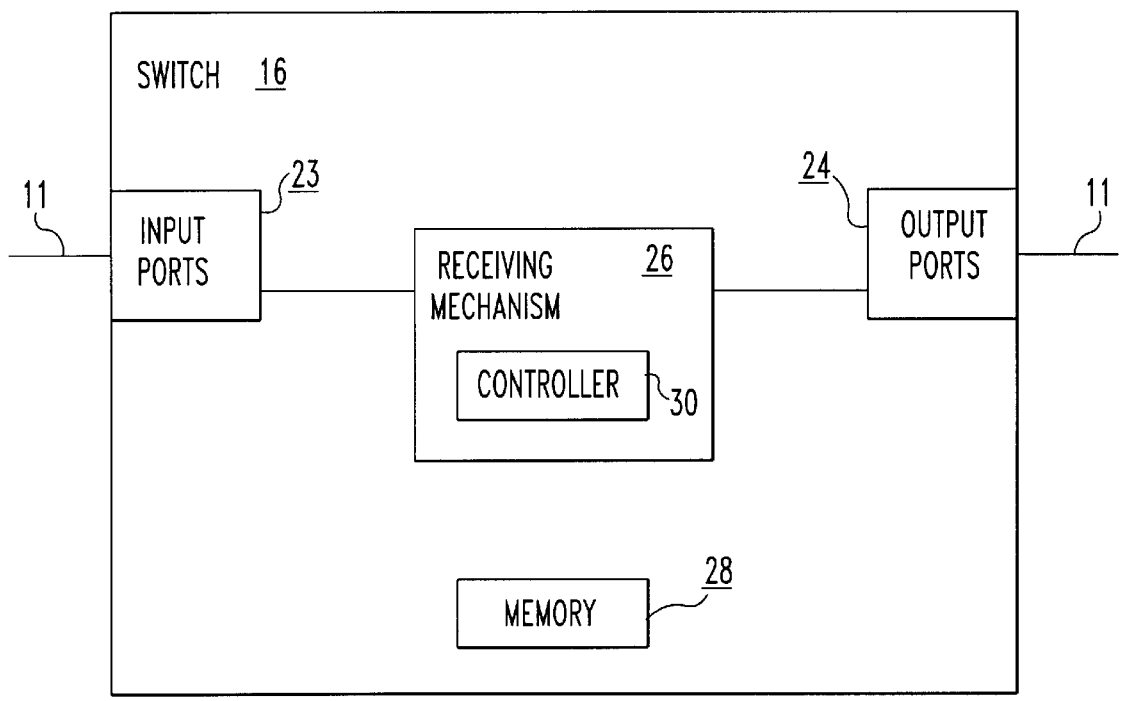
FIG. 3 is a schematic representation of a switch of the present invention.

The present invention pertains to a switch 16 for switching MPLS packets 18 and ATM cells in a network 11, as shown in FIG. 3. (The network 11 can include an MPLS network 12 and a modified ATM network 14.) The switch 16 comprises input ports 23 for receiving MPLS packets 18 and ATM cells from the network 11. Each MPLS packet 18 has a first label 20 for directing the packet to a desired switch 16 and a second label 22 for directing the packet in the switch 16 to a desired outport in the switch 16. The system 10 comprises output ports 24 for sending MPLS packets 18 and ATM cells to the network 11. The system 10 comprises a mechanism for reviewing the second label 22 of the packet while maintaining the first label 20 with the packet. The reviewing mechanism 26 is connected to the input ports 23 and the output ports 24.

Preferably, the switch 16 includes a memory 28 with connection information along which the packets travel in the network 11. The connection information identifies ATM connections and MPLS connections. The memory 28 is connected to the reviewing mechanism 26. The connection information, for ATM cells preferably includes VC/VP connection information and wherein the reviewing mechanism 26 includes a controller 30 which transfers MPLS packets 18 according to their labels and ATM cells according to their VC/VP connection information stored in the memory 28.

Preferably, the MPLS packet 18 is an AAL5 packet. The AAL5 packet preferably has cells which have words and the first label 20 is disposed in a first word of a first cell of the AAL5 packet. Preferably, the second label 22 is disposed in a second word of the first cell of the AAL5 packet. The first word it preferably has a shim header that has a null label value and carries a EXP value and TTL value. Preferably, the cells include an EOM cell and wherein the controller 30 recognizes an EOM cell of a previous packet received by the input ports 23 and reads the second word of the first cell to obtain the second label 22.

The present invention pertains to a method for transmitting packets in a communications network 11. The method comprises the steps of sending an MPLS packet 18 on an MPLS network 12 to a first switch 16 connected to a modified ATM network 14 and the MPLS network 12. Then there is the step of transferring the MPLS packet 18 to a second switch 16 of the ATM network 14 with the first switch 16 through the ATM network 14.

Preferably, the transferring step includes the step of reviewing a first label 20 of the MPLS packet 18 which directs the MPLS packet 18 to the second switch 16. The transferring step preferably includes the step of reviewing a second label 22 of the MPLS packet 18 which directs the MPLS packet 18 in the first switch 16 to a desired output port 24 of the first switch 16.

Preferably, the reviewing the second label 22 step includes the step of reviewing the second label 22 of the MPLS packet 18 while maintaining the first label 20 with the MPLS packet 18.

After the transferring step, there is preferably the step of transmitting an ATM cell with the first switch 16 according to connection information from the ATM cell stored in a memory 28 in the first switch 16. Preferably, before the transferring step, there is the step of reading an EOM cell of a previous packet received by the first switch 16.

In the operation of the invention, and referring to FIGS. 2, 3 and 4, by adding a label to the front of every packet, the task of forwarding packets at interior nodes of the network 11 becomes dramatically simpler. The edge of the ISP network 11 performs a classification and routing operation on incoming packets, and then attaches one or more labels to the front of each packet and sends the packet into the "dumb" core network 11. The IP header of the packet need not be looked at again until the packet reaches the egress edge of the ISP network 11. By combining labeled packets with explicit routing of label paths through the MPLS network 12, MPLS gains the source routing benefit of ATM—IP packets need not go along the "shortest" path to reach their destination, and every node in the network 11 need not use the same metric when making an IP forwarding decision. The ingress edge of the network 11 can choose the route based on local policy, in order to load-balance traffic throughout the network 11 (for example, by taking longer but less loaded paths from a given source to a given destination), or to achieve other traffic engineering objectives.

Labels and MPLS Label switched paths (LSPs) can be thought of as connections (similar to ATM virtual circuits). In order to avoid the $N^2$ connection problem of the ATM point-to-point network 11, MPLS defines procedures to allow the merging of traffic to the same destination, similar to VC Merge.

Given a device capable of receiving IP packets on an input port 23, and performing an MPLS encapsulation and transmission into an ATM core network, the input interface of such a device is expected to do the following:

1. Perform an IP lookup and packet classification on the incoming packet (e.g. from POS),
2. Determine the appropriate ATM VC on which to forward the packet, and
3. Encapsulate the packet with the appropriate MPLS Labels prior to sending.

MPLS uses the term "Forwarding Equivalence Class" or FEC to describe the set of packets that can be mapped onto a single label switched path. This mapping could be as simple as mapping the destination IP network 11 to a FEC, or could be a considerably more complicated algorithm taking into account more fields of the IP packet and perhaps looking at L4 fields as well.

Key to the operation of an MPLS network 12 will be the allocation and distribution of the MPLS labels among the edge devices in the network 11. To date, there are at least three possible label distribution scenarios, one using LDP (for Label Distribution Protocol), one based on RSVP, and one based on a combination of the Border Gateway Protocol (BGP) and RSVP. Signaling the binding between FEC and label is outside the scope of this document.

The primary MPLS deployment scenario is the logical extension of the topology deployed today. Namely, an ATM network 14 at the core and an IP/ATM interworking device attached to either IP routers or MPLS label switches. The most interesting case is one where an ATM switch containing POS ports (e.g., an ASX-4000 with Chameleon port cards from FORE Systems, Warrendale, Pa) is an edge device. The ASX-4000 uses either MPLS or speaks raw IP to the directly connected routers. MPLS is also used to communicate with other edge devices across the ATM core.

As explained above, the ISPs want their core networks to be stable. In particular, when topology changes occur, it is imperative that the core networks recover quickly and for outages to be minimized. This requirement often manifests itself as a desire to minimize the number of connections that must be setup in order to provide full connectivity.

There are two likely MPLS+ATM network scenarios and a third possible scenario envisioned:

1. ATM backbone networks where the ATM core does not support VC-Merge, but where the attached edge devices are capable of performing label merge on outgoing ATM interfaces,
2. ATM backbone networks where the ATM core supports VC-Merge, and,
3. ATM backbone networks where the ATM core does not support VC-Merge, and where the attached edge devices are not capable of performing label merge from different input ports 23 to a single output virtual circuit.

The first two network types can be built from competitor MPLS switches available in the marketplace. The third network topology will be encountered in a network 11 where ASX-4000s with Series-1 port cards comprise the core, and ASX-4000s with Chameleon comprise the edge devices.

Referring to Scenario 1: Non-VC Merge-Capable ATM Core Networks, in this type of network, the edge devices are expected to be connected via an N^2 mesh of LSPs (Label Switched Paths), similar to the ATM network 14 today. In order to reduce the number of LSPs seen by the core of the network 11, the edge devices will map any given FEC (forwarding equivalence class) to a two-level label. The top-level label will be used within the core network 11 to route the packet to the appropriate edge device. The second label 22 will be used internally by the egress device to route the packet to the appropriate output port 24. The intent of this scheme is to reduce the number of LSPs required within the core of the network 11, while allowing the edge devices to perform a simple label lookup on reception from ATM to route the packet internally.

This topology requires the edge devices to be capable of doing a label-merge on transmission to ATM. In addition, the edge devices must be capable of receiving a packet from the ATM link, and to be able to pop the top label and to route within the. box based on the second label 22 in the stack.

With respect to Scenario 2: VC Merge-Capable ATM Core Networks, when the ATM network 14 is capable of merging virtual circuits, then there are two possible network topologies. The first possibility is to reduce the N^2 mesh above to N multipoint-to-point trees, where each edge device is the single receiver, and every other edge device is a sender. In this case, two labels will still be used for each packet of a given FEC, similar to Scenario 1. The top-level label will route packets to the appropriate edge device, while the second label 22 in the stack will be used by the edge device to route the packets internally.

This type of network requires edge devices that are capable of VC Merge on transmission to ATM, and the label pop operation on reception from ATM.

There is second possible topology. If the edge devices are not capable of doing a label pop operation on reception from ATM, then the network topology would require more multipoint-to-point trees. The minimum number of trees that would be required is on the order of the sum of the number of ports in each edge device. Ports dedicated to connections into the ATM core are not counted in this sum. Instead of having one multipoint-to-point tree per edge router, there would be one per edge port.

With respect to Scenario 3: Non-merge capable ATM core switches and non-merge capable Edge devices (Leapfrog with Series-1 and Chameleon) available from FORE Systems, this scenario is the worst case in terms of connection usage in the core of the network 11 unless virtual paths are used. Since MPLS does not directly support virtual paths, there are two cases, one where VPs are used to directly connect the edge devices of the network 11, and one where no VPs are used and the network 11 connection space is "flat".

In the case of using VPs to directly connect the edge devices of the network 11, there are a couple of issues that prevent its deployment. The first is that the size of the VP space is small, at 4096 possible VPs per port. Given that multiple parallel VPs would need to be used to support different classes of service, this cuts the number of possible edge nodes down by a factor of 4 to 8, leaving the possible number of edge nodes at 512 to 1024. This is deemed to be too small to be sufficiently scalable to be deployed.

In the second case, a mesh of connections is required, on the order of (N*M)^2 where N is the number of edge devices, and M is the number of ports per edge device. Requiring this many VCCs is a serious architectural risk for this solution, in terms customer acceptance. Overall scalability is poor since nothing has been done to address the N^2 problem with this solution.

The following table is a summary of the above information, for each type of network 11. Included is a summary of the scalability of the solution for both the homogeneous edge where all edge devices are ASX-4000-based, and the heterogeneous edge, where there is a mix of different vendor's edge equipment. In the heterogeneous edge case, a core of ASX-4000s is assumed, and some mix of ASX-4000s with Chameleon cards (available from FORE Systems) as edge devices and some mix of Juniper, Cisco, or other competitor edge device. In the table below, N is the number of edge devices, and M is the sum of the ports in each edge device not used for connection of the edge device to the core.

Functionality of ATM Equipment

| Core Switch Capable of VC Merge? | Edge Switch Capable of VC Merge? | Edge Switch Capable of V C-: Unmerge on ATM Rx? | Homongenous Network: Scalability of Solution | Heterogeneous Edge Devices: Scalability of Solution | Network Equipment Required |
|---|---|---|---|---|---|
| No | No | No | Poor scalability. O(M*N) VCCs required. | Poor scalability. Serious VC usage issues on other vendors Edge devices | ASX-4000 with Series-1 or Series-2 port cards, Chameleon POS blades in edge switches. |
| No | Yes | No | Poor scalability. Unless the CORB can merge, VC Merge at the edge does not improve the scalability. O(M*N) VCCs are required. | Poor overall. Fewer VCCs are required to send from an Chameleon to a competitor's box, but the same number as the above to receive from the competitors' box. | ASX-4000 with Poseidon- based port cards, and Chameleon POS blades in edge switches. Core switches can contain Series -1 or Series-2 port cards. |
| Yes | Yes | No | Good scalability. O(M) multi-point to point trees are required per service class. | Marginal. Has the potential to exhaust VC space in competitor's ATM uplinks. | ASX-4000 with Poseidon port-cards everywhere in edge and core switches. |
| Yes | Yes | Yes | Very good scalability. O(N) multi-point to point trees are required per service class. | Very good scalability. Minimum use of VC resources on competitor's ATM uplinks. | Need Poseidon modification to support |
| No | Yes | Yes | Good scalability. High number of VCCs used in the core. | Good scalability. Has the potential to exhaust VC space in competitor's uplink products. | Need Poseidon modification to support |

The modification required to Poseidon (available from FORE Systems) is as follows. See FIG. 3. For a new type of VC, the MPLS VC, the input side of Poseidon is augmented with the capability to de-multiplex incoming MPLS labeled packets, where the label is contained in the second word of the first cell of an AAL5 packet. The first word is a "shim" header that contains a null label value, and is used only for carrying the COS and TTL values of the top-level label. The second label 22 is used as the fabric route word within the switch 16, for the first and remaining cells of the. AALS packet from which the label was extracted. The modification requires the input side to identify AAL5 packets within incoming streams, and to record the route word contained therein until the next AAL5 start of packet event occurs.

An unfortunate complication is that the same second-level MPLS label may be received on different incoming ports, but fabric connection-ids coming from different ports must be unique. Therefore, in order to make a unique fabric connection id, the connection id derived from the MPLS label will have to be a combination of the original connection id and the MPLS label. Bit-19 of the MPLS label is used to indicate that this label must be made unique, and that an extra 4-bit register be added to Poseidon to specify how many of the bits to be replaced.

In addition, bits 25:27 of the route-word indicate that the cells should be copied to the control port. This feature is not required for MPLS VCCs. Therefore, bits 25:27 of the route word should be copied from the original route-word (the one arrived at by looking up the VP/VC). OAM cells received on this VC are sent to the control port, and RM cells are to be dropped.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A communication system comprising:
   a multiprotocol label switching network, and
   a modified ATM network connected to the multiprotocol label switching network on which multiprotocol label switching packets can travel, wherein the ATM network has at least one switch and wherein each multiprotocol label switching packet has a first label for directing the multiprotocol label switching packet to a desired switch and a second label for directing the multiprotocol label switching packet in the one switch to a desired output port in the one switch, wherein the one switch has a mechanism for reviewing the second label of the packet while maintaining the first label with the MPLS packet.

2. A system as described in claim 1 wherein the switch has a memory with connection information along which the packets travel, the connection information identifying ATM connections and multiprotocol label switching connections.

3. A system as described in claim 2 wherein the switch transfers multiprotocol label switching packets according to their labels and ATM cells according to their VC/VP connection information stored in the memory.

4. A system as described in claim 3 wherein at least one of the multiprotocol label switching packets is an AAL5 packet.

5. A system as described in claim 4 wherein the first label is disposed in a first word of a first cell of the AAL5 packet.

6. A system as described in claim 5 wherein the second label is disposed in a second word of the first cell of the AAL5 packet.

7. A system as described in claim 6 wherein the first word is a shim header that has a null label value and carries a class of service value and trace transit list value.

8. A system as described in claim 7 wherein the switch includes a controller which recognizes an end of message cell of a previous packet received by the switch and reads the second word of the first cell to obtain the second label.

9. A switch for switching multiprotocol label switching packets and ATM cells in a network comprising:

input ports for receiving multiprotocol label switching packets and ATM cells from the network, each multiprotocol label switching packet having a first label for directing the packet to a desired switch and a second label for directing the packet in the switch to a desired outport in the switch;

output ports for sending multiprotocol label switching packets and ATM cells to the network; and a mechanism for reviewing the second label of the packet while maintaining the first label with the packer, said reviewing mechanism connected to the input ports and the output ports.

10. A switch as described in claim 9 including a memory with connection information along which the packets travel in the network, the connection information identifying ATM connections and multiprotocol label switching connections, said memory connected to the reviewing mechanism.

11. A switch as described in claim 10 wherein the connection information for ATM cells includes VC/VP connection information and wherein the reviewing mechanism includes a controller which transfers multiprotocol label switching packets according to their labels and ATM cells according to their VC/VP connection information stored in the memory.

12. A switch as described in claim 11 wherein at least one of the multiprotocol label switching packets is an AAL5 packet.

13. A switch as described in claim 12 wherein the AAL5 packet has cells which have words and the first label is disposed in a first word of a first cell of the AAL5 packet.

14. A switch as described in claim 13 wherein the second label is disposed in a second word of the first cell of the AAL5 packet.

15. A switch as described in claim 14 wherein the first word has a shim header that has a null label value and carries a class of service value and trace transit list value.

16. A switch as described in claim 15 wherein the cells include an end of message cell and wherein the controller recognizes an end of message cell of a previous packet received by the input ports and reads the second word of the first cell to obtain the second label.

17. A method for transmitting packets in a communications network comprising the steps of:

sending a multiprotocol label switching packet on a multiprotocol label switching network to a first switch connected to a modified ATM network and the multiprotocol label switching network;

reviewing a first label of the multiprotocol label switching packet which directs the multiprotocol label switching packet to a second switch of the ATM network;

reviewing a second label of the multiprotocol label switching packet which directs the multiprotocol label switching packet in the first switch to a desired output port of the first switch while maintaining the first label with the multiprotocol label switching packet; and transferring the multiprotocol label switching packet with the first switch through the ATM network to the second switch of the ATM network.

18. A method as described in claim 17 wherein after the transferring step, there is the step of transmitting an ATM cell through the ATM network with the first switch according to connection information from the ATM cell stored in a memory in the first switch.

19. A method as described in claim 18 including before the transferring step, there is the step of reading an end of message cell of a previous packet received by the first switch.

20. A method for transmitting packets in a communications network comprising the steps of:

adding a first label, which contains routing and classification information, to a beginning of a multiprotocol label switching packet;

reviewing only the first label of the multiprotocol label switching packet at an ingress of an ATM network; and transferring the multiprotocol label switching packet through the ATM network without reviewing the first label again.

21. A method for transmitting cells in a communications network comprising the steps of:

identifying a first cell, having a first label for writing and classifying the cell and a second label for directing the cell in a switch to a desired output port of the switch, of a plurality of related subsequently received cells at a switch;

extracting the second label from the first cell;

storing the second label in a memory; and using the second label for transferring subsequently received cells until a lost cell of the related cells is received, without ever combining the cells into a packet.

* * * * *